(12) United States Patent
Schneider et al.

(10) Patent No.: US 12,370,900 B2
(45) Date of Patent: Jul. 29, 2025

(54) PROVIDING BRAKING CAPACITY INFORMATION ASSOCIATED WITH ONE OR MORE BRAKING SYSTEMS OF A MACHINE

(71) Applicant: Caterpillar Global Mining Equipment LLC, Denison, TX (US)

(72) Inventors: Karl P. Schneider, Decatur, IL (US); Cameron T. Lane, Oro Valley, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 263 days.

(21) Appl. No.: 18/162,448

(22) Filed: Jan. 31, 2023

(65) Prior Publication Data

US 2024/0253469 A1  Aug. 1, 2024

(51) Int. Cl.
  *B60L 7/26* (2006.01)
(52) U.S. Cl.
  CPC ............. *B60L 7/26* (2013.01); *B60L 2250/16* (2013.01)
(58) Field of Classification Search
  None
  See application file for complete search history.

(56) References Cited

U.S. PATENT DOCUMENTS

| | | | |
|---|---|---|---|
| 4,485,444 A | 11/1984 | Maruyama et al. | |
| 7,647,141 B2 | 1/2010 | Foster et al. | |
| 9,187,079 B2 | 11/2015 | Antao et al. | |
| 10,077,033 B2 | 9/2018 | Oswald et al. | |
| 2013/0049945 A1* | 2/2013 | Crombez | B60K 35/00 340/453 |
| 2013/0057053 A1 | 3/2013 | Staub et al. | |
| 2013/0328675 A1* | 12/2013 | Roach | B60Q 9/00 340/453 |
| 2014/0258908 A1 | 9/2014 | Miyoshi | |
| 2017/0210371 A1 | 7/2017 | Fraser et al. | |

(Continued)

FOREIGN PATENT DOCUMENTS

CN  112721886  4/2021

OTHER PUBLICATIONS

Written Opinion and International Search Report for Int'l. Patent Appln. No. PCT/US2024/010247, mailed May 3, 2024 (15 pgs).

*Primary Examiner* — Lail A Kleinman

(57) ABSTRACT

A machine includes a display component that is configured to receive, from a controller of the machine, braking capacity information associated with one or more braking systems of the machine and braking utilization information associated with the one or more braking systems of the machine. The display component is configured to display, based on the braking capacity information, one or more current braking capacities of the one or more braking systems and a total current braking capacity of the one or more braking systems of the machine. The display component is configured to display, based on the braking utilization information, a current braking utilization of the machine. The controller is configured to determine the braking capacity information based on machine data associated with operation of the machine, and to determine the braking utilization information based on the machine data and worksite information associated with a worksite of the machine.

20 Claims, 6 Drawing Sheets

(56) References Cited

U.S. PATENT DOCUMENTS

| | | |
|---|---|---|
| 2018/0201264 A1 | 7/2018 | Schoenly |
| 2018/0206395 A1 | 7/2018 | Kale et al. |
| 2022/0056672 A1 | 2/2022 | Nomura et al. |
| 2022/0289037 A1* | 9/2022 | Yokoo ............. B60W 30/18127 |

* cited by examiner

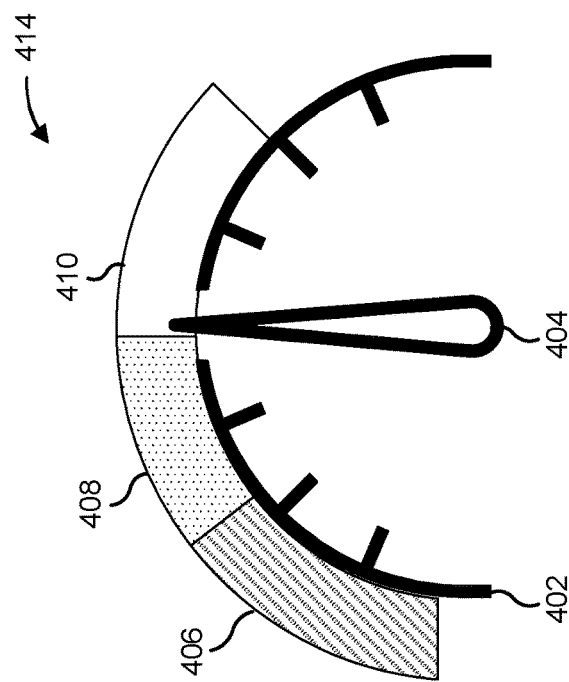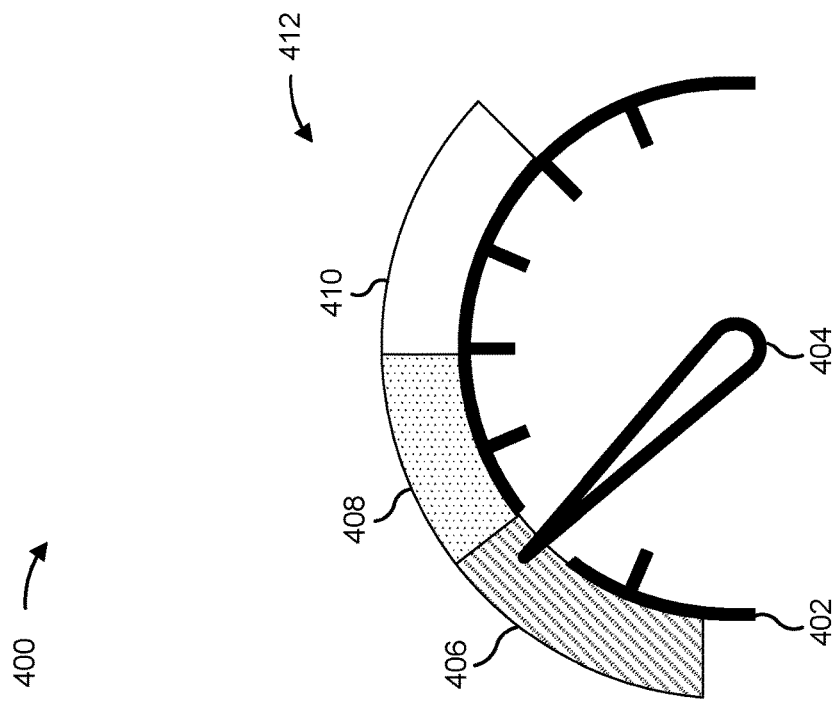
FIG. 4

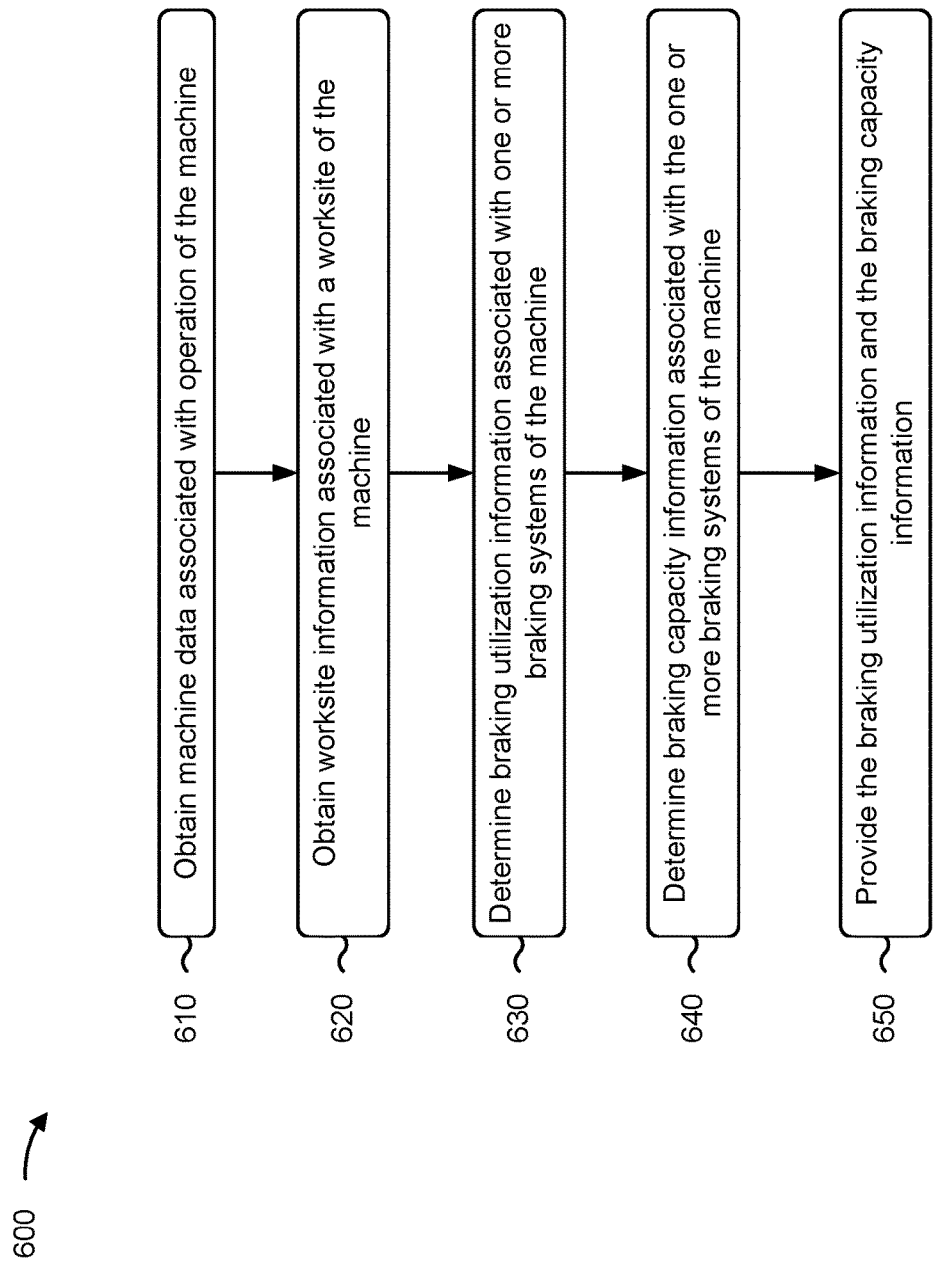

PROVIDING BRAKING CAPACITY INFORMATION ASSOCIATED WITH ONE OR MORE BRAKING SYSTEMS OF A MACHINE

TECHNICAL FIELD

The present disclosure relates generally to providing braking capacity information and, for example, to providing current braking capacity information, and real-time utilization thereof, for one or more braking systems of a machine.

BACKGROUND

A braking system (e.g., a mechanical braking system, such as friction brakes, a driveline retarder, or compression brakes; an electric braking system, such as a dissipative grid or a battery regeneration system; or another type of braking system) is used in a machine to control, slow, and stop the machine. Exemplary machines include trains, dump trucks, and mining vehicles. During operation of the machine, a braking capacity (e.g., a continuous braking capacity, an intermittent braking capacity, or another type of braking capacity) of the braking system often changes due to operating conditions of the machine and/or its systems and components, environmental conditions of a worksite at which the machine is operating, a status of a component of the braking system (e.g., a temperature of a brake fluid of a mechanical braking system, or a charge level of a battery of an electric braking system, among other examples), and/or other factors. However, an operator of the machine is typically provided default braking capacity guidance for the machine that is based on hypothetical scenarios, which often do not align with real-life operational circumstances. This can result in the operator operating the machine in a way that increases a wear and tear on the braking system (e.g., by propelling the machine down a steep grade at a too high speed), which can impact an operational life of components of the braking system. Additionally, or alternatively, this can result in the operator operating the machine in a way that impacts a work performance of the machine (e.g., because the operator is not aware of how to operate machine in an optimal manner with respect to available braking capacity of the machine). For example, the operator may not operate the machine at fast speeds, such as at speeds associated with an intermittent braking capacity that is greater than a continuous braking capacity, which reduces a number of runs across the worksite that the machine can perform in a particular amount of time. Further, in many cases, a machine may include multiple braking systems, and an operator may not know how to operate the machine in a manner that optimally utilizes the braking systems. For example, it may be preferred that a regenerative braking system be primarily utilized to reduce an overall amount of emissions that are produced during operation of the machine, but the operator may operate the machine in a manner that overuses a mechanical braking system of the machine.

U.S. patent Application Publication 2013/0057053 ("the '053 publication") discloses braking systems and methods that combine electric retarding and friction braking to slow a machine. While the '053 publication discloses a user interface that allows an operator of the machine to view status information relating to a braking system on a display, wherein displayed information may include whether an electric retarding capacity has been exceeded, the '053 publication does not disclose determining (e.g., based on machine data associated with operation of the machine) respective braking capacity information associated with one or more braking systems of a machine (e.g., in real-time) and total braking capacity information, and providing the information for presentation to an operator of the machine by a display component of the machine. Further the '053 publication does not disclose displaying a current utilization of braking power (e.g., as compared to total braking capacity).

The controller and the display component of the present disclosure solve one or more of the problems set forth above and/or other problems in the art.

SUMMARY

In some implementations, a presentation system of a machine includes a display component that is configured to: receive, from a controller of the machine, braking capacity information associated with one or more braking systems of the machine and braking utilization information associated with the one or more braking systems of the machine; display, based on the braking capacity information, one or more current braking capacities of the one or more braking systems; display, based on the braking capacity information, a total current braking capacity of the one or more braking systems of the machine; and display, based on the braking utilization information, a current braking utilization of the machine.

In some implementations, a machine includes one or more braking systems; a display component; and a controller, wherein: the display component is configured to: receive, from the controller, braking capacity information associated with the one or more braking systems and braking utilization information associated with the one or more braking systems; display, based on the braking capacity information, one or more current braking capacities of the one or more braking systems; display, based on the braking capacity information, a total current braking capacity of the one or more braking systems; and display, based on the braking utilization information, a current braking utilization of the machine.

In some implementations, a method includes obtaining, by a controller of a machine, machine data associated with operation of the machine; obtaining, by the controller, worksite information associated with a worksite of the machine; determining, based on the machine data, braking utilization information associated with one or more braking systems of the machine; determining, by the controller, and based on the machine data and the worksite information, braking capacity information associated with the one or more braking systems of the machine; and providing, by the controller and to a display component of the machine, the braking utilization information and the braking capacity information.

BRIEF DESCRIPTION OF THE DRAWINGS

FIG. 4 includes diagrams of display examples of the display component.

FIG. 6 is a flowchart of an example process associated with providing braking capacity information associated with one or more braking systems of a machine.

DETAILED DESCRIPTION

Figure 1:
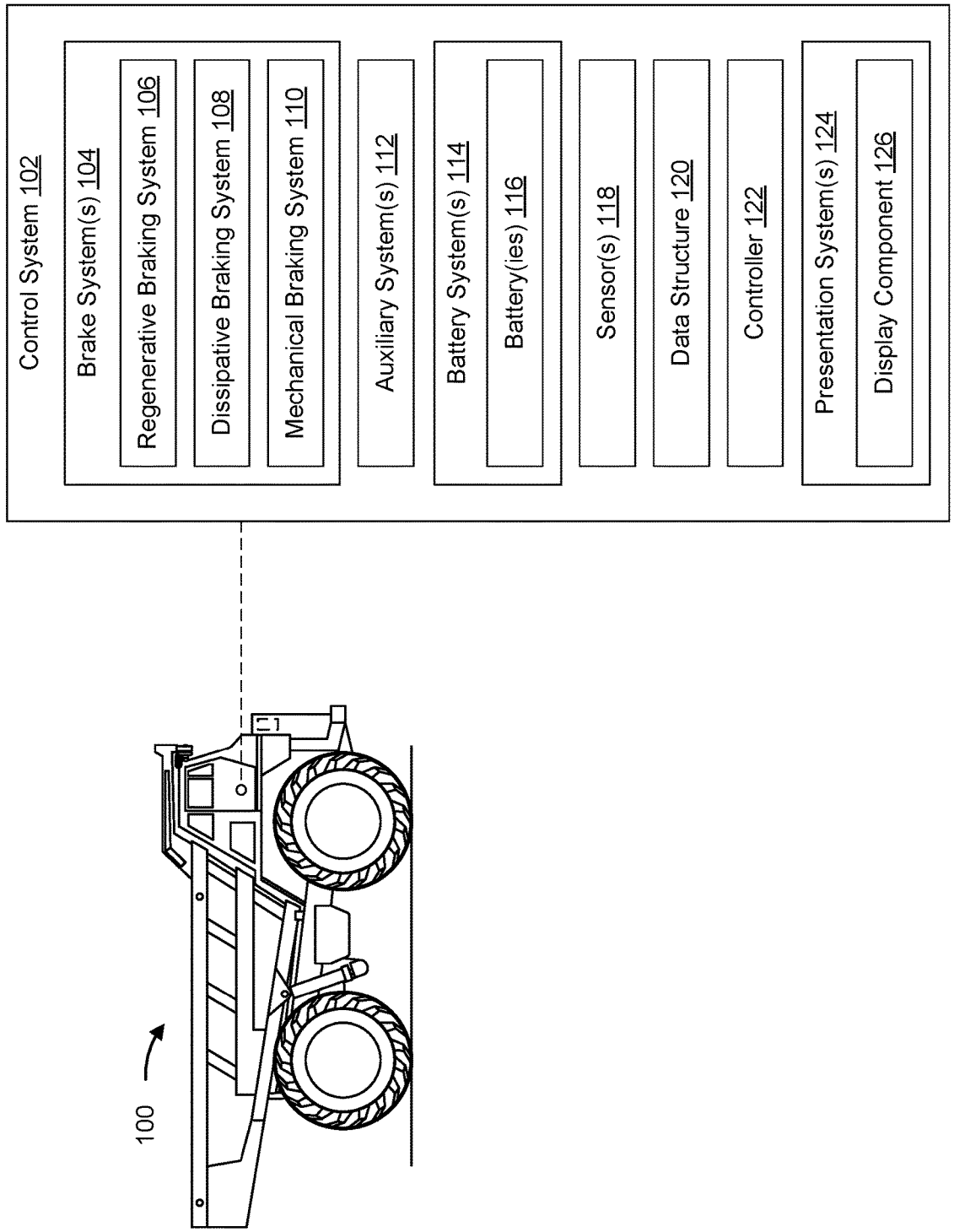
FIG. 1 is a diagram (e.g., a side-view) of an example machine described herein.

FIG. 1 is a diagram (e.g., a side-view) of an example machine 100 described herein. The machine 100 may be a mobile machine or vehicle, and may include a dump truck, a wheel loader, a hydraulic excavator, a train, or another type of machine. The machine 100 may be a battery electric machine (BEM), a battery electric vehicle (BEV), a hybrid vehicle, a fuel cell and battery hybrid vehicle, a machine or vehicle with an internal combustion engine, or another type of machine or vehicle. The machine 100 may be configured to operate at, and/or travel around, a worksite, such as a mine site, a quarry, a construction site, or any other type of worksite or work environment.

As further shown in FIG. 1, the machine 100 may include a control system 102. The control system 102 may include one or more braking systems 104, such as a regenerative braking system 106, a dissipative braking system 108, a mechanical braking system 110, or another type of braking system. As further shown in FIG. 1, the control system 102 may include one or more auxiliary systems 112; one or more battery systems 114, which may include one or more batteries 116; one or more sensors 118; a data structure 120; a controller 122; and/or a presentation system 124, which may include a display component 126. These systems and devices are described in more detail below in connection with FIG. 6.

A braking operation that can be implemented by one or more of the braking systems 104 may be associated with an amount of brake power. For example, the regenerative braking system 106 may capture energy when the machine 100 performs a braking operation, and the captured energy may be associated with an amount of brake power. A braking operation may be a deceleration operation that applies braking torque to slow the speed of machine 100 (e.g., from a current speed to a lower speed) and/or to stop the machine 100. Alternatively, the braking operation may be a retarding operation that applies braking torque to maintain a current speed of the machine 100. For example, if the machine 100 is traveling downhill, and might otherwise accelerate downhill (e.g., due to gravitational forces), the one or more braking systems 104 may operate to prevent acceleration and thereby maintain the current speed of the machine 100.

Each of the one or more braking systems 104 may have a braking capacity (e.g., an amount of braking power the braking system 104 can exert, such as measured in kilowatts (kW) or horsepower (hp)). Accordingly, the one or more braking systems 104 may have a total braking capacity, which is a sum of the respective braking capacities of the one or more braking systems 104. Further, each of the one or more braking systems 104 may have an instantaneous current braking capacity (e.g., that is available at an instant in time), a continuous braking capacity (e.g., that is available for an open-ended amount of time), and/or an intermittent current braking capacity (e.g., that is available for a particular period of time and/or particular distance). The one or more braking systems 104 may therefore also have an instantaneous total current braking capacity, a continuous total braking capacity, and/or an intermittent total current braking capacity.

The regenerative braking system 106 may be configured to capture kinetic energy and/or potential energy during braking operations of the machine 100. For example, energy captured by the regenerative braking system 106 may be stored in the one or more battery systems 114, and thereby charge the one or more batteries 116, or may be sent elsewhere (e.g., to an external power line, such as when the machine is a train or tram). As another example, energy captured by the regenerative braking system 106 may be used to directly power the one or more auxiliary systems 112, or may to power one or more other systems of the machine 100. A braking capacity (e.g., an instantaneous braking capacity, a continuous braking capacity, and/or an intermittent braking capacity, as described herein) of the regenerative braking system 106 may change due to one or more conditions of, or associated with, operating the machine 100, such as a temperature of the one or more batteries 116 (or one or more battery cells of the one or more batteries 116), a state of charge (SoC) of the one or more batteries 116, a state of health (SoH) of the one or more batteries 116, an ambient temperature, a condition and/or grade of the worksite, and/or other factors.

The dissipative braking system 108 may be a dynamic braking system that is configured to capture kinetic energy and/or potential energy during braking operations of the machine 100, and/or is configured to receive energy captured by the regenerative braking system 106. The dissipative braking system 108 may include one or more resistors, such that the dissipative braking system 108 may dissipate captured energy as heat in the one or more resistors. For example, the dissipative braking system 108 may include a resistive grid with a coil that conducts electricity while blowers blow air across the coil. Such a resistive coil can consume energy by converting the energy to heat. A braking capacity (e.g., an instantaneous braking capacity, a continuous braking capacity, and/or an intermittent braking capacity, as described herein) of the dissipative braking system 108 may change due to one or more conditions of, or associated with, operating the machine 100, such as a temperature of the one or more resistors, a temperature of the resistive grid (or components thereof), an ambient temperature, a condition and/or grade of the worksite, and/or other factors.

The mechanical braking system 110 may include mechanical components, such as mechanical elements configured to apply brake pads against rotors, or to apply brake disks against plates through a piston, to frictionally slow down wheels of the machine 100, and/or mechanical elements to resist motion of the machine 100, such as a hydraulic driveline retarder or other components to facilitate engine compression braking. The mechanical braking system 110 may be a service braking system, such as a hydraulic braking system or other mechanical braking system. A braking capacity (e.g., an instantaneous braking capacity, a continuous braking capacity, and/or an intermittent braking capacity, as described herein) of the mechanical braking system 110 may change due to one or more conditions of, or associated with, operating the machine 100, such as a temperature of the brake pads, a temperature of the rotors, a temperature of a brake oil, an ambient temperature, a condition and/or grade of the worksite, and/or other factors.

The one or more auxiliary systems 112 may be configured to operate using energy provided by the one or more battery systems 114 and/or the regenerative braking system 106. The one or more auxiliary systems 112 may include electric engines, electric motors, electrical conversion systems, electric drivetrains, electric pumps, electric compressors, electric fans, and/or other components that are configured to convert and/or use energy to cause propulsion of the machine 100, to power movement and/or other operations of work tools or other electrically-powered systems or components associated with the machine 100, and/or otherwise power operations of the machine 100.

The battery system 114 may include the one or more batteries 116, such as one or more lithium-ion (Li-ion) batteries, lithium-ion polymer batteries, lithium iron phosphate (LFP) batteries, lithium titanium oxide (LTO) batteries, nickel-metal hydride (NiMH) batteries, lead-acid batteries, nickel cadmium (Ni—Cd) batteries, zinc-air batteries, sodium-nickel chloride batteries, solid-state batteries, or other types of batteries. In some implementations, multiple battery cells may be grouped together, in series or in parallel, within a battery module. Multiple battery modules may be grouped together, such as in series, within a battery string. One or more battery strings may be provided within a battery pack, such as a group of battery strings linked together in parallel. Accordingly, the battery system 114 may include one or more battery packs, one or more battery strings, one or more battery modules, and/or one or more battery cells.

The machine 100 may have one or more sensors 118. The one or more sensors 118 may include cameras, light detection and ranging (LIDAR) sensors, radio detection and ranging (RADAR) sensors, other optical sensors or perception systems, global positioning system (GPS) sensors, other location and/or positioning sensors, payload sensors, speed sensors, ambient temperature sensors, brake temperature sensors, battery temperature sensors, other temperature sensors, battery SoH sensors, current and/or voltage sensors, ambient pressure sensors, inertial measurement unit (IMU) sensors, inclinometers, incline and decline travel sensors, and/or other types sensors. Accordingly, the one or more sensors 118 may capture machine data associated with operation of the machine 100.

The machine data may include, for example, temperature data, pressure data, grade data, payload data, speed data, braking demand data, and/or other data. The temperature data may include ambient temperature data related to an ambient temperature associated with the machine 100, battery temperature data related to a temperature of at least one of the one or more batteries 116 and/or the one or more battery system 114, battery cell temperature data related to a temperature of one or more battery cells of the one or more batteries 116, battery coolant temperature data related to a temperature of a battery coolant of the one or more batteries 116 and/or the one or more battery system 114, resistor temperature data related to a temperature of one or more resistors of the dissipative braking system 108, dissipative grid temperature data related to a temperature of a dissipative grid of the dissipative braking system 108, and/or brake oil temperature data related to a brake oil of the mechanical brake system 110, among other examples. The pressure data may include, for example, atmospheric pressure data related to an atmospheric pressure associated with the machine 100, and/or other pressure data associated with one or more components of the machine 100. The grade data may include, for example, incline data that indicates an incline (or decline) of the machine 100 (e.g., at the worksite), and/or other grade data. The payload data may include, for example, weight data associated with the machine 100 and/or a payload of the machine, and/or other payload data. The speed data may include, for example, machine speed data associated with a speed of the machine 100, motor speed data associated with a motor of the machine 100, and/or other speed data associated with the machine 100. The braking demand data may include individual braking demand data that indicates one or more braking demands of the one or more braking systems 104, total braking demand data that indicates a total braking demand of the one or more braking systems 104, and/or other braking demand data associated with the one or more braking systems 104.

The data structure 120 may include a database, a table, an electronic folder, an electronic file, and/or another type of data structure. The data structure may be configured to store worksite information associated with a worksite (e.g., the worksite at which the machine is operating). The worksite information may indicate terrain of the worksite; locations and/or identities of obstacles at the worksite; one or more locations and/or a rolling resistance of the machine 100 (e.g., when operating at the worksite); distances and/or locations of roads or other routes of the worksite; ground types and/or ground conditions of the worksite; and/or other information. The worksite information may also indicate grades or slopes of the terrain, such as incline levels or decline levels associated with portions of the worksite. The worksite information may be pre-loaded into the data structure 120, or the machine 100 (e.g., using the controller 122) may generate the worksite information based on machine data detected by the one or more sensors 118 (e.g., in association with paths previously traversed by the machine 100 through an area of the worksite). The worksite information may be provided by an external device (e.g., an off-board system, such as associated with a mine worksite), and may be provided in real-time (or near real-time), or on a scheduled basis, on an on-demand basis, on a triggered basis, or on an ad-hoc basis.

The controller 122 may be configured to communicate with and/or control one or more other systems and/or components of the control system 102. The controller 122 may be configured to communicate with the one or more sensors 118 to obtain machine data associated with operation of the machine 100 (e.g., that is detected by the one or more sensors 118). As described above, the machine data may include temperature data, pressure data, grade data, payload data, speed data, braking demand data, and/or other data. Additionally, the controller 122 may be configured to communicate with the data structure 120 to obtain worksite information associated with a worksite (e.g., at which the machine 100 is operating).

The controller 122 may be configured to process the machine data, or the machine data and the worksite information. For example, the controller 122 may process the machine data (or the machine data and the worksite information), using one or more processing techniques, such as one or more thermal model processing techniques, one or more component temperature processing techniques, one or more derating factors processing techniques, one or more loss model processing techniques, one or more path prediction techniques, one or more braking calculation techniques (e.g., based on Ohm's law for electric power calculations and/or one or more hydraulic piston friction brake equations for mechanical power calculations), and/or one or more other processing techniques. In this way, the controller 122 may determine braking capacity information associated with the one or more braking systems 104 and/or braking utilization information associated with the one or more braking systems 104.

The braking capacity information may indicate one or more current braking capacities of the one or more braking systems 104 (e.g., one or more calculated, target current braking capacities of the one or more braking systems 104 based on predicted future performance of the machine 100 and/or the one or more braking systems 104, which is determined based on the machine data and/or the worksite information using the one or more processing techniques described above). For example, the braking capacity information may indicate, for a braking system 104, at least one of an instantaneous current braking capacity of the braking system 104, a continuous current braking capacity of the braking system 104, or an intermittent current braking capacity of the braking system 104. The braking capacity information also may indicate a total current braking capacity of the one or more braking systems 104 (e.g., at least one of an instantaneous total current braking capacity of the one or more braking systems 104, a continuous total current braking capacity of the one or more braking systems 104, or an intermittent total current braking capacity of the one or more braking systems 104), and/or other braking capacity information. The braking utilization information may indicate a current braking utilization of the machine 100, a current braking utilization of each of the one or more braking systems 104, and/or other braking utilization information.

The controller 122 may provide the braking utilization information and/or the braking capacity information to the display component 126 of the one or more presentation systems 124. For example, the controller 122 may provide the braking utilization information and/or the braking capacity information to the display component 126 to allow the display component 126 to display at least some of the braking utilization information and/or the braking capacity information.

The one or more presentations systems 124 may be configured to present information associated with operation of the machine 100, operation of one or more components of the machine 100, and/or other information to an operator of the machine 100. The one or more presentation systems 124 may be include in a cab of the machine 100 and may include one or more components that are configured to visually, audibly, and/or tactically present information to the operator of the machine 100. For example, a presentation system 124 may include a display component 126 that is configured to display (e.g., using a user interface of the display component 126) at least some of the braking utilization information and/or the braking capacity information (e.g., based on receiving the braking utilization information and/or the braking capacity information from the controller 122). The display component 126 include a display screen (e.g., a light emitting diode (LED) display screen, a liquid crystal display (LCD) display screen, or another type of display screen); a touchscreen; a projected, holographic, or augmented reality display, such as a heads-up display device or a head-mounted device; and/or a similar device. The display component 126 may also include a speaker, a haptic feedback component, or one or more other similar components.

Figure 2:
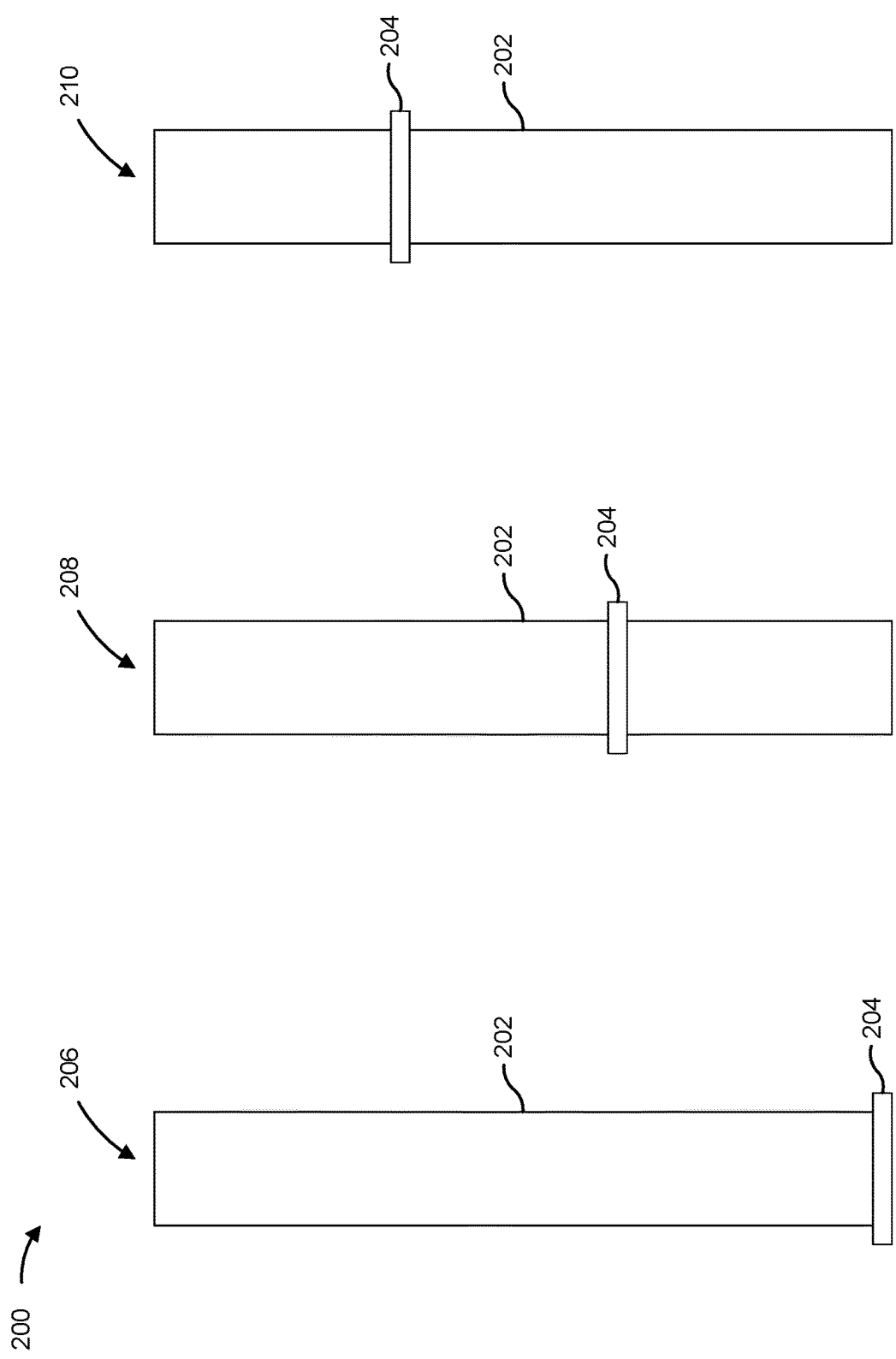
FIG. 2 includes diagrams of display examples of a display component described herein.
Figure 3:
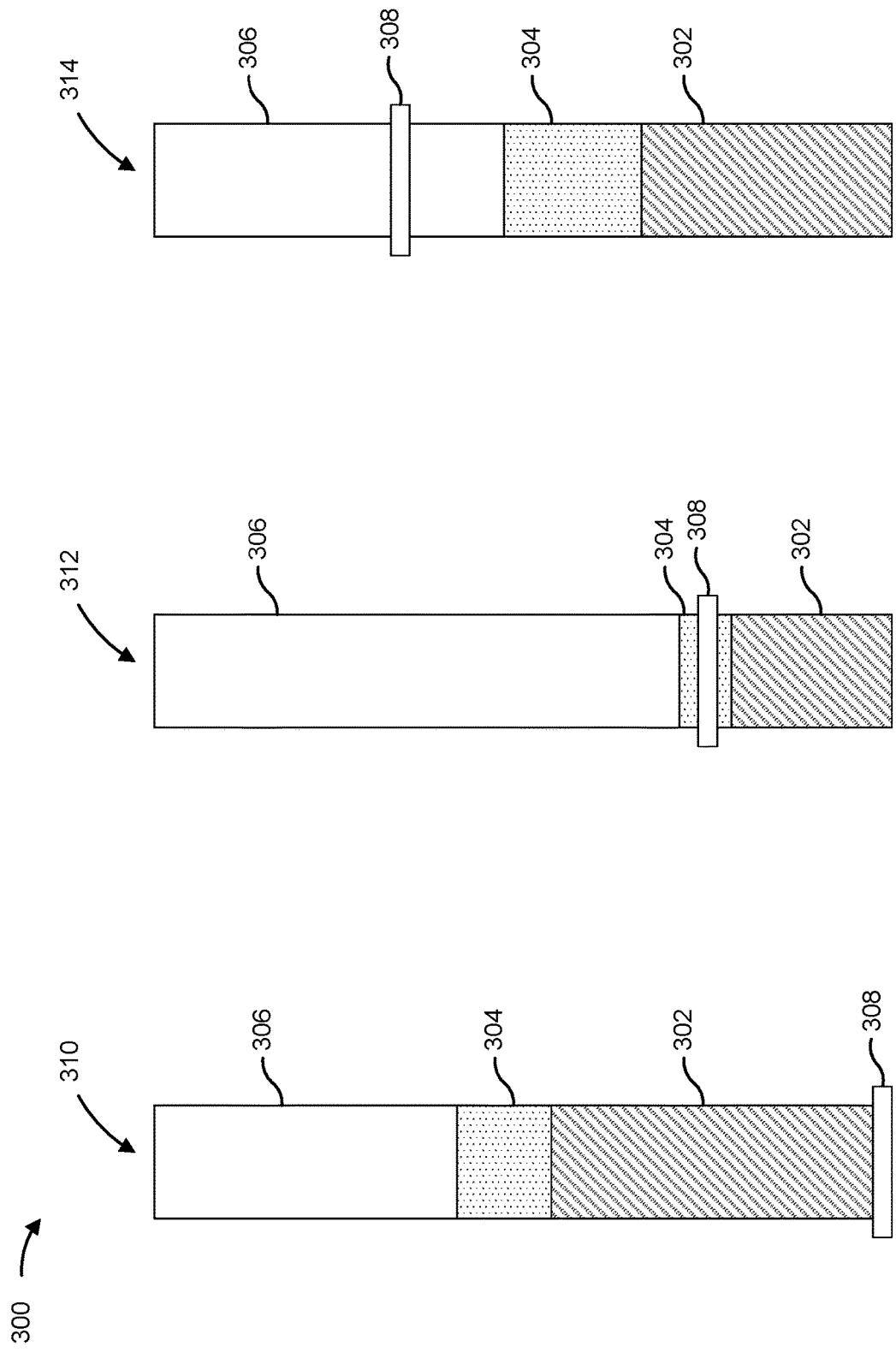
FIG. 3 includes diagrams of display examples of the display component.

In some implementations, the display component 126 may be configured to display (e.g., based on the braking capacity information) the one or more current braking capacities of the one or more braking systems 104 and/or the total current braking capacity of the one or more braking systems 104. For example, the display component 126 may display the one or more current braking capacities of the one or more braking systems 104 in a stacked arrangement, such as shown in FIGS. 2-3. The display component 126 may therefore display the total current braking capacity of the one or more braking systems 104 in association with the stacked arrangement. The display component 126 may display a current braking capacity and/or braking capacity type (e.g., instantaneous, continuous, or intermittent) of each braking system 104 using at least one of a particular color, a particular shading, a particular patterning, or one or more other visual characteristics. In this way, an operator of the machine 100 that views the display component 126 is able to discern the one or more current braking capacities of the one or more braking systems 104 and/or the total current braking capacity of the one or more braking systems 104.

Additionally, or alternatively, the display component 126 may be configured to display the current braking utilization of the machine 100. For example, the display component 126 may display the current braking utilization of the machine 100 as an indicator element (e.g., overlaid on the stacked arrangement, such as shown in FIGS. 2-3). In this way, an operator of the machine 100 that views the display component 126 is able to discern the current braking utilization of the machine 100.

In some implementations, the controller 122 may be configured to process the braking capacity information, or the braking capacity information and the machine data. For example, the controller 122 may process the braking capacity information (or the braking capacity information and the machine data), using one or more processing techniques, such as one or more parameter balancing techniques (e.g., to balance braking capacity, resistance, and/or gravity parameters), and/or one or more other processing techniques. In this way, the controller 122 may determine speed capability information associated with a speed of the machine 100. The speed capability information may indicate, for example, a speed (e.g., a current speed) of the machine 100 and one or more speed range targets that are associated with at least one of the current braking capacities of the one or more braking systems 104 or the total current braking capacity of the one or more braking systems 104. A speed range target may indicate, for example, a speed range (e.g., greater than or equal to a minimum speed and less than or equal to a maximum speed of the speed range) in which the machine 100 may utilize current braking capacity associated with a braking system 104, or a total current braking capacity of the one or more braking systems 104. A speed within a speed range target may be determined by, for example, dividing the current braking capacity associated with a braking system 104, or a total current braking capacity of the one or more braking systems 104, by an effective force (e.g., a grade force, such as gravity, minus one or more dissipative forces, such as rolling resistance, wind drag, and/or other forces). Accordingly, the controller 122 may provide the speed capability information to the display component 126. For example, the controller 122 may provide the speed capability information to the display component 126 to allow the display component 126 to display at least some of the speed capability information.

The display component 126 may be configured to display at least some of the speed capability information (e.g., based on receiving the speed capability information from the controller 122). For example, the display component 126 may be configured to display the speed of the machine 100 and the one or more speed range targets. In a specific example, as further shown in FIG. 4, the display component 126 may display a speedometer that has an indicator element and a speed dial; may display, based on the speed capability information, the indicator element pointing at the speed of the machine on the speed dial; and may display the one or more speed range targets in association with one or more corresponding speed ranges of the speed dial (e.g., may display the one or more speed ranges overlaid on, or in proximity with, the one or more corresponding ranges of the speed dial). In this way, an operator of the machine 100 that views the display component 126 is able to discern the one or more speed range targets (e.g., that are associated with at least one of the current braking capacities of the one or more braking systems 104 or the total current braking capacity of the one or more braking systems 104).

As indicated above, FIG. 1 is provided as an example. Other examples may differ from what is described in connection with FIG. 1.

FIG. 2 includes diagrams 200 of display examples of the display component 126, such as when the machine 100 includes a single braking component 104 (e.g., one of a regenerative braking system 106, a dissipative braking system 108, a mechanical braking system 110, or another braking system). In each display example, the display component 126 may display a current braking capacity of the braking system 104, such as by a bar 202. A size (e.g., a height) of the bar 202 may indicate the current braking capacity of the braking system 104 (e.g., a tall bar 202 may indicate a large current braking capacity, and/or a short bar 202 may indicate a small current braking capacity). Because the machine 100 includes only a single braking component 104, the size of the bar 202 may also indicate a total current braking capacity of the braking system 104 (e.g., a total current braking capacity of the machine 100). Further, the display component 126 may display a current braking utilization of the machine 100, such as by an indicator element 204. For example, a position (e.g., a vertical position) of the indicator element 204 on the bar 202 may indicate the current braking utilization (e.g., in relation to the current braking capacity of the braking system 104).

As shown by display example 206, the display component 126 may display the bar 202 with a particular height, and the indicator element 204 positioned at a bottom of the bar 202. The bar 202 indicates a particular current braking capacity of the braking system 104 and the indicator element 204 indicates there is no current braking utilization of the machine 100 (e.g., the current utilization is 0).

As shown by display example 208, the display component 126 may display the bar 202 with a particular height, and the indicator element 204 positioned at a particular position within a bottom half of the bar 202. The bar 202 indicates a particular current braking capacity of the braking system 104, and the indicator element 204 indicates a particular braking utilization of the machine 100 that is equivalent to the particular position of the indicator element 204 in relation to the particular height of the bar 202 (e.g., the particular braking utilization of the machine 100 is less than or equal to 50% of the particular current breaking capacity of the braking system 104).

As shown by display example 210, the display component 126 may display the bar 202 with a particular height, and the indicator element 204 positioned at a particular position within a top half of the bar 202. The bar 202 indicates a particular current braking capacity of the braking system 104, and the indicator element 204 indicates particular braking utilization of the machine 100 that is equivalent to the particular position of the indicator element 204 in relation to the particular height of the bar (e.g., the particular braking utilization of the machine 100 is greater than or equal to 50% of the particular current breaking capacity of the braking system 104).

As indicated above, FIG. 2 is provided as an example. Other examples may differ from what is described in connection with FIG. 2.

FIG. 3 includes diagrams 300 of display examples of the display component 126, such as when the machine 100 includes multiple braking systems 104. In each display example, the display component 126 may display current braking capacities of the braking systems 104, such as by one or more bars (e.g., bars 302, 304, and 306) in a stacked arrangement. A size (e.g., a height) of each bar may indicate a current braking capacity of a braking system 104 associated with the bar (e.g., as described elsewhere herein). Because the machine 100 includes multiple braking systems 104, a size (e.g., a height) of the stacked arrangement (e.g., a sum of the sizes of the one or more bars) may indicate a total current braking capacity of the braking systems 104 (e.g., a total current braking capacity of the machine 100). Further, the display component 126 may display a current braking utilization of the machine 100, such as by an indicator element 308. For example, a position (e.g., a vertical position) of the indicator element 308 within the stacked arrangement may indicate the current braking utilization of the machine 100 (e.g., in relation to the total current braking capacity of the braking system 104). The indicator element 308 may also indicate which of the braking systems 104 are currently utilized. For example, when the position of the indicator element 308 coincides with a particular bar in the stacked arrangement, this may indicate that a braking system 104 associated with the bar is utilized, and that any braking system 104 associated with a bar upon which the bar is stacked (e.g., any bar below the particular bar) is also utilized.

As shown by display example 310, the display component 126 may display the stacked arrangement of bars, each with a particular height. This indicates particular current braking capacities of a first braking system 104 (e.g., a regenerative braking system 106) associated with bar 302, a second braking system 104 (e.g., a dissipative braking system 108) associated with bar 304, and a third braking system 104 (e.g., a mechanical braking system 110) associated with bar 306. Further, the height of the stacked arrangement indicates the total current braking capacity of the braking systems 104. The display component 126 may also display the indicator element 308 positioned at a bottom of the stacked arrangement, which may indicate that there is no current braking utilization of the machine 100 (e.g., the current utilization is 0).

As shown by display example 312, the display component 126 may display the stacked arrangement of bars, and the indicator element 308 positioned at a particular position within a bottom half of the stacked arrangement of bars. The respective heights of the bars indicate respective particular current braking capacities of the braking systems 104 associated with the bars, and the height of the stacked arrangement indicates a total current braking capacity of the braking systems 104. The particular position of the indicator element 308 may indicate a current braking utilization of the machine 100, and which of the braking systems 104 are currently utilized. For example, because the particular position of the indicator element 308 coincides with the bar 304 (e.g., that is associated with the second braking system 104), the indicator element 308 indicates that the second braking system 104 is currently utilized, as well as the first braking system 104 (e.g., because the bar 304 is stacked on the bar 302, which is associated with the first braking system 104).

As shown by display example 314, the display component 126 may display the stacked arrangement of bars, and the indicator element 308 positioned at a particular position within a top half of the stacked arrangement of bars. The respective heights of the bars indicate respective particular current braking capacities of the braking systems 104 associated with the bars, and the height of the stacked arrangement indicates a total current braking capacity of the braking systems 104. The particular position of the indicator element 308 may indicate a current braking utilization of the machine 100, and which of the braking systems 104 are currently utilized. For example, because the particular position coincides with the bar 306 (e.g., that is associated with the third braking system 104), the indicator element 308 indicates that the third braking system 104 is currently utilized, as well as the second braking system 104 and the first braking system 104 (e.g., because the bar 306 is stacked on the bar 304 and the bar 302, which are associated with the second braking system 104 and the first braking system 104).

Other display examples are possible. For example, the display component 126 may display a current braking capacity and a braking capacity type (e.g., instantaneous, continuous, or intermittent) of each braking system 104, such as by one or more bars in a stacked arrangement. A size (e.g., a height) of each bar may indicate a current braking capacity and a braking capacity type of a braking system 104 associated with the bar. When the machine 100 includes multiple braking systems 104, a size (e.g., a height) of the stacked arrangement (e.g., a sum of the sizes of the one or more bars) may indicate a total current braking capacity of the braking systems 104 (e.g., a total current braking capacity, of any braking capacity type, of the machine 100). Further, the display component 126 may display a current braking utilization of the machine 100, such as by an indicator element (e.g., in a similar manner as disclosed herein). The indicator element may indicate which of the braking systems 104, and of what braking capacity type, are currently utilized. For example, when the position of the indicator element coincides with a particular bar in the stacked arrangement, this may indicate that a braking system 104 and a braking capacity type associated with the bar is utilized, and that any braking system 104 and braking capacity type associated with a bar upon which the bar is stacked (e.g., any bar below the particular bar) is also utilized.

In some implementations, the display component 126 may display different types of current braking capacity information. For example, the display component 126 may display "continuous only" current braking capacity information, where the display component 126 displays a current continuous braking capacity of each braking system 104, such as by one or more bars in a stacked arrangement. As another example, the display component 126 may display "combined continuous and intermittent" current braking capacity information, where the display component 126 displays a current continuous and intermittent braking capacity of each braking system 104, such as by one or more bars (e.g., where each bar is a combination of continuous and intermittent braking capacity of each braking system 104) in a stacked arrangement. In an additional example, the display component 126 may display "individual continuous and intermittent" current braking capacity information, where the display component 126 displays a current continuous braking capacity and current intermittent braking capacity (if present) of each braking system 104, such as by one or more bars (e.g., where each bar is a current continuous braking capacity or a current intermittent braking capacity each braking system 104) in a stacked arrangement. Alternatively, the display component 126 may display different combinations of current braking capacity information.

The display component may 126 dynamically change a color, a shading, a patterning, or one or more other visual characteristics of one or more bars in a stacked arrangement based on satisfaction of one or more conditions. For example, the display component 126 may make a change when the current braking utilization of the machine 100 exceeds a threshold level (e.g., that is greater than or equal to 90%, for example) of total current braking capacity of the braking systems 104, or of a current braking capacity of a particular braking system 104 (e.g., the mechanical braking system 110, which is typically the final or backstop braking system). As another example, the display component 126 may make a change when a status of a component of a particular braking system 104 is critical or otherwise affects a current braking capacity of the particular braking system 104 (e.g., a temperature of a brake oil of the mechanical braking system 110 exceeds a temperature threshold associated with overheating of the mechanical braking system 110). In this way, an operator of the machine 100 that views the display component 126 is able to discern that total current braking capacity of the braking systems 104, or the current braking capacity of the particular braking system 104, is close to being consumed.

As indicated above, FIG. 3 is provided as an example. Other examples may differ from what is described in connection with FIG. 3.

FIG. 4 includes diagrams 400 of display examples of the display component 126, such as when the machine 100 includes multiple braking systems 104. In each display example, the display component 126 may display the one or more speed range targets described elsewhere herein (e.g., that are associated with at least one of the current braking capacities of the braking systems 104 or the total current braking capacity of the braking systems 104). Each display example may include a speedometer that has a speed dial 402 and an indicator element 404. Accordingly, the display component 126 may display a speed (e.g., a current speed) of the machine 100, such as by displaying the indicator element 404 pointing at the speed of the machine 100 on the speed dial 402. Further, the display component 126 may display the one or more speed targets, such as by one or more segments (e.g., segments 406, 408, and 410), in association with corresponding one or more speed ranges of the speed dial 402. For example, the display component 126 may display the one or more segments overlaid on, or in proximity with (e.g., next to), the one or more corresponding ranges of the speed dial 402. The display component 126 therefore may display which speed range target the machine 100 is travelling within, such as by displaying the indicator element 404 pointing at a particular segment (e.g., that is associated with the speed of the machine 100), which is associated with a speed range target on the speed dial 402.

Further, the indicator element 404 may also indicate which of the braking systems 104 may be utilized to perform a braking operation when the machine 100 is travelling at the current speed of the machine 100. For example, each speed range target may be associated with a braking system 104, and therefore a segment associated with a speed range target is also associated with a braking system 104. Accordingly, when the indicator element 404 points at a particular segment (e.g., in association with a particular speed range of the speed dial 402), this may indicate that a braking system 104 associated with the particular segment is to be utilized, and that any braking system 104 associated with a segment that is associated with a lower speed range (e.g., any segment to the left of the particular segment) is also to be utilized.

As shown by display example 412, the display component 126 may display the speedometer with the segments 406, 408, and 410 in association with corresponding one or more speed ranges of the speed dial 402. The indicator element 404 may be pointing at a particular speed (e.g., a "low" speed) on the speed dial 402 to indicate that the speed (e.g., the current speed) of the machine 100 is the particular speed. Additionally, the indicator element 404 may be pointing to the segment 406 to indicate that the speed of the machine 100 is travelling within a speed range target associated with the segment 406, which may also indicate that a particular braking system 104 associated with the segment 406 is to be utilized to perform a braking operation at the particular speed.

As shown by display example 414, the display component 126 may display the speedometer with the segments 406, 408, and 410 in association with corresponding one or more speed ranges of the speed dial 402. The indicator element 404 may be pointing at a particular speed (e.g., a "high" speed) on the speed dial 402 to indicate that the speed (e.g., the current speed) of the machine 100 is the particular speed. Additionally, the indicator element 404 may be pointing at the segment 410 to indicate that the speed of the machine 100 is travelling within a speed range target associated with the segment 410, which may also indicate that braking systems 104 associated with the segments 406, 408, and 410 are to be utilized to perform a braking operation.

As indicated above, FIG. 4 is provided as an example. Other examples may differ from what is described in connection with FIG. 4.

Figure 5:
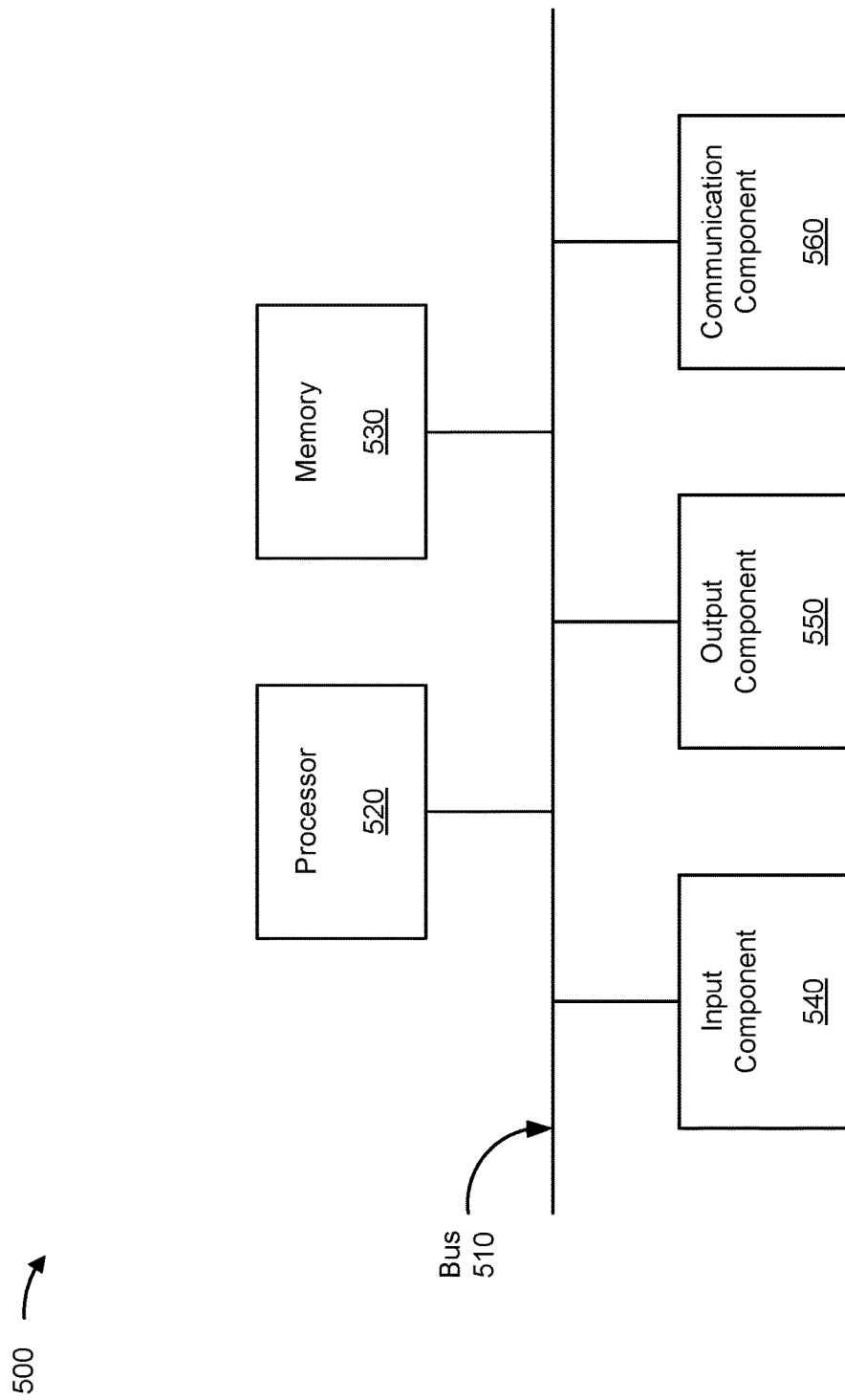
FIG. 5 is a diagram of example components of a device associated with providing braking capacity information associated with one or more braking systems of a machine.

FIG. 5 is a diagram of example components of a device 500 associated with providing braking capacity information associated with one or more braking systems of a machine. The device 500 may correspond to the control system 102 and/or one or more systems or devices of the control system 102, such as the controller 122; the presentation system 124, and/or the display component 126. In some implementations, the control system 102 and/or one or more systems or devices of the control system 102, such as the controller 122; the presentation system 124, and/or the display component 126, may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500.

In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with providing braking capacity information associated with one or more braking systems of a machine. In some implementations, one or more process blocks of FIG. 6 may be performed by a controller (e.g., the controller 122). In some implementations, one or more process blocks of FIG. 6 may be performed by another device or a group of devices separate from or including the controller, such as a control system (e.g., the control system 102) and/or one or more systems or devices of the control system, such as a presentation system (e.g., the presentation system 124) and/or a display component (e.g., the display component 126). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include obtaining machine data associated with operation of the machine (block 610). For example, the controller may obtain machine data associated with operation of the machine, as described above.

As further shown in FIG. 6, process 600 may include obtaining worksite information associated with a worksite of the machine (block 620). For example, the controller may obtain worksite information associated with a worksite of the machine, as described above.

As further shown in FIG. 6, process 600 may include determining braking utilization information associated with one or more braking systems of the machine (block 630). For example, the controller may determine, based on the machine data, braking utilization information associated with one or more braking systems of the machine, as described above.

As further shown in FIG. 6, process 600 may include determining braking capacity information associated with the one or more braking systems of the machine (block 640). For example, the controller may determine, based on the machine data and the worksite information, braking capacity information associated with the one or more braking systems of the machine, as described above.

As further shown in FIG. 6, process 600 may include providing the braking utilization information and the braking capacity information (block 650). For example, the controller may provide, to a display component of the machine, the braking utilization information and the braking capacity information, as described above. In some implementations, providing the braking utilization information and the braking capacity information to the display component allows the display component to display, based on the braking capacity information, one or more current braking capacities of the one or more braking systems; display, based on the braking capacity information, a total current braking capacity of the one or more braking systems of the machine; and display, based on the braking utilization information, a current braking utilization of the machine.

In some implementations, alone or in combination with the first implementation, process 600 includes determining, based on the braking capacity information, speed capability information associated with a speed of the machine, and providing, to the display component, the speed capability information to the display component to allow the display component to displaying, based on the speed capability information, the speed of the machine and one or more speed range targets.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

The disclosed controller (e.g., the controller 122) and the disclosed display component (e.g., the display component 126) may be used in any machine that utilizes one or more braking systems. The controller obtains machine data associated with operation of the machine and worksite information associated with a worksite of the machine, and thereby determines braking utilization information associated with the one or more braking systems and/or braking capacity information associated with the one or more braking systems. The controller provides this information to the display component, which allows the display component to display at least some of the information. For example, the display component displays one or more current braking capacities of the one or more braking systems, a total current braking capacity of the one or more braking systems, and/or a current braking utilization of the machine.

Accordingly, this allows an operator of the machine that views the display component to discern the one or more current braking capacities of the one or more braking systems, the total current braking capacity of the one or more braking systems, and/or the current braking utilization of the machine. With this knowledge, the operator can operate the machine in a manner that optimally utilizes the braking systems. For example, it may be preferred that a regenerative braking system be primarily utilized to reduce an overall amount of emissions that are produced during operation of the machine, so the operator may operate the machine in a manner that ensures primary use of the regenerative braking system (e.g., as opposed to another braking system, such as a mechanical braking system). As another example, the operator may operate the machine in a manner (e.g., by propelling the machine at a reduced speed on a steep downhill grade) that reduces wear and tear on the one or more braking systems, which can increase an operational life of the one or more braking systems. In an additional example, the operator may operate the machine in a manner (e.g., by propelling the machine at an increased speed on a path typically rated for a lower speed) that improves a work performance of the machine (e.g., by increasing a number of runs across the worksite that the machine can perform in a particular amount of time). In another example, such as when an available braking capacity is low, the operator may operate the machine in a manner as to not overshoot the available braking capacity, which reduces risk of damage to the machine.

What is claimed is:

1. A presentation system of a machine, comprising:
a display component that is configured to:
receive, from a controller of the machine, braking capacity information associated with a plurality of braking systems of the machine and braking utilization information associated with the plurality of braking systems;
display, based on the braking capacity information, a plurality of current braking capacities of the plurality of braking systems relative to a plurality of speed range targets of the machine;
display, based on the braking capacity information, a total current braking capacity of the plurality of braking systems of the machine; and
display, based on the braking utilization information, a current braking utilization of the machine.

2. The presentation system of claim 1, wherein the display component, to display the plurality of current braking capacities of the one or more braking systems, is configured to:
display at least one of a current braking capacity or a braking capacity type of each braking system using at least one of:
a particular color;
a particular shading; or
a particular patterning.

3. The presentation system of claim 1, wherein the display component, to display the plurality of current braking capacities of the plurality of braking systems, is configured to:
display the plurality of current braking capacities of the plurality of braking systems in a stacked arrangement.

4. The presentation system of claim 3, wherein displaying the plurality of current braking capacities of the plurality of braking systems in the stacked arrangement allows the display component to display the total current braking capacity of the plurality of braking systems in association with the stacked arrangement.

5. The presentation system of claim 3, wherein the display component, to display the current braking utilization of the machine, is configured to:
- display the current braking utilization of the machine as an indicator element overlaid on the stacked arrangement.

6. The presentation system of claim 1, wherein the display component is further configured to:
- receive, from the controller, speed capability information associated with a speed of the machine; and
- display, based on the speed capability information, the speed of the machine.

7. The presentation system of claim 6, wherein the display component, to display the speed of the machine and the one or more speed range targets, is configured to:
- display a speedometer that has an indicator element and a speed dial;
- display, based on the speed capability information, the indicator element pointing at the speed of the machine on the speed dial; and
- display the one or more speed range targets in association with one or more corresponding speed ranges of the speed dial.

8. A machine, comprising:
a plurality of braking systems;
a display component; and
a controller, wherein:
the display component is configured to:
- receive, from the controller, braking capacity information associated with the plurality of braking systems and braking utilization information associated with the plurality of braking systems;
- display, based on the braking capacity information, a plurality of current braking capacities of the plurality of braking systems relative to a plurality of speed range targets of the machine;
- display, based on the braking capacity information, a total current braking capacity of the plurality of braking systems; and
- display, based on the braking utilization information, a current braking utilization of the machine.

9. The machine of claim 8, wherein the plurality of braking systems include at least one of:
a regenerative braking system,
a dissipative braking system, or
a mechanical braking system.

10. The machine of claim 8, wherein the controller is configured to:
- obtain machine data associated with operation of the machine;
- determine, based on the machine data, the braking utilization information;
- determine, based on the machine data, the braking capacity information; and
- provide, to the display component, the braking utilization information and the braking capacity information.

11. The machine of claim 10, wherein the controller is further configured to obtain worksite information associated with a worksite of the machine, and
wherein the controller, to determine the braking capacity information, is configured to:
- process, using one or more processing techniques, the machine data and the worksite information to determine the braking capacity information.

12. The machine of claim 8, wherein the braking capacity information indicates the total current braking capacity of the plurality of braking systems as at least one of:
an instantaneous total current braking capacity of the plurality of braking systems,
a continuous total current braking capacity of the plurality of braking systems, or
an intermittent total current braking capacity of the plurality of braking systems.

13. The machine of claim 8, wherein the braking capacity information indicates a current braking capacity of a braking system, of the plurality of braking systems, as at least one of:
an instantaneous current braking capacity of the braking system,
a continuous current braking capacity of the braking system, or
an intermittent current braking capacity of the braking system.

14. The machine of claim 8, wherein the display component, to display the plurality of current braking capacities of the plurality of braking systems, is configured to:
- display the plurality of current braking capacities of the plurality of braking systems in a stacked arrangement.

15. The machine of claim 14, wherein the display component, to display the current braking utilization of the machine, is configured to:
- display the current braking utilization of the machine as an indicator element in association with the stacked arrangement.

16. The machine of claim 8, wherein the display component is further configured to:
- receive, from the controller, speed capability information associated with a speed of the machine; and
- display, based on the speed capability information, the speed of the machine.

17. The machine of claim 16, wherein the display component, to display the speed of the machine and the one or more speed range targets, is configured to:
- display a speedometer that has an indicator element and a speed dial;
- display, based on the speed capability information, the indicator element pointing at the speed of the machine on the speed dial; and
- display the one or more speed range targets in association with corresponding one or more speed ranges of the speed dial.

18. A method, comprising:
- obtaining, by a controller of a machine, machine data associated with operation of the machine;
- obtaining, by the controller, worksite information associated with a worksite of the machine;
- determining, based on the machine data, braking utilization information associated with a plurality of braking systems of the machine;
- determining, by the controller, and based on the machine data and the worksite information, braking capacity information associated with the plurality of braking systems of the machine; and
- providing, by the controller and to a display component of the machine, the braking utilization information and the braking capacity information to allow the display component to:
  - display, based on the braking capacity information, the plurality of current braking capacities of the plurality of braking system relative to a plurality of speed range targets of the machine.

19. The method of claim 18, wherein providing the braking utilization information and the braking capacity information to the display component further allows the display component to:
 display, based on the braking capacity information, a total current braking capacity of the one or more braking systems of the machine; and
 display, based on the braking utilization information, a current braking utilization of the machine.

20. The method of claim 18, further comprising:
 determining, based on the braking capacity information, speed capability information associated with a speed of the machine; and
 providing, to the display component, the speed capability information to the display component to allow the display component to:
  display, based on the speed capability information, the speed of the machine.

* * * * *